United States Patent [19]
Acquaro

[11] Patent Number: 4,883,393
[45] Date of Patent: Nov. 28, 1989

[54] CARGO TRAILER SAFETY LOCK

[76] Inventor: William D. Acquaro, 268 Sackett Rd., Westfield, Mass. 01085

[21] Appl. No.: 181,169

[22] Filed: Apr. 13, 1988

[51] Int. Cl.⁴ .............................................. B60P 1/00
[52] U.S. Cl. ...................................... 410/52; 292/102; 312/221
[58] Field of Search ............... 410/52, 69, 94; 292/95, 292/101, 102, 194, 202, 203; 312/220, 221, 216; 296/50

[56] References Cited

U.S. PATENT DOCUMENTS

| | | | |
|---|---|---|---|
| 629,959 | 8/1899 | Glahn | 292/95 X |
| 998,592 | 7/1911 | Shrauger | 292/95 X |
| 1,068,466 | 7/1913 | Underwood | 292/101 |
| 2,030,677 | 2/1936 | Avels | 292/102 X |
| 2,775,355 | 12/1956 | Leitner | 410/52 |
| 3,083,670 | 4/1963 | Harlander | 410/85 |
| 3,439,822 | 4/1969 | Korodi | 410/52 |
| 3,580,185 | 5/1971 | Bridge | 410/86 |
| 3,762,340 | 10/1973 | Udaloff | 410/94 |
| 3,986,460 | 10/1976 | Voigt et al. | 410/69 |
| 4,163,425 | 8/1979 | Bedard | 410/82 |
| 4,347,023 | 8/1982 | Rizos | 136/245 |

Primary Examiner—Johnny D. Cherry
Assistant Examiner—Joseph D. Pape
Attorney, Agent, or Firm—Leon Gilden

[57] ABSTRACT

A cargo trailer safety lock is set forth for securing typical trailer doors of piggy-back type trailers. A first embodiment includes an upwardly biased "U" shaped bracket oriented into a latch position by an "L" shaped spring-like lever secured to a plate attached to an associated railroad car to maintain latching of the trailer doors until removal of the trailer. A second embodiment includes an elongate sliding latch directed upwardly upon positioning of an associated piggy-back trailer onto a freight car into a latch orientation relative to trailer doors associated with a trailer. A third embodiment includes a generally "U" shaped pivotal latch mechanism with upstanding orthogonally oriented legs maintained in a locking position relative to trailer doors of an associated trailer. A fourth embodiment of the instant invention includes a pivotal bar secured to an associated piggy-back trailer that cooperates with an opening in a cooperating railroad flatbed car to maintain a blocking orientation relative to trailer doors of the associated trailer.

11 Claims, 6 Drawing Sheets

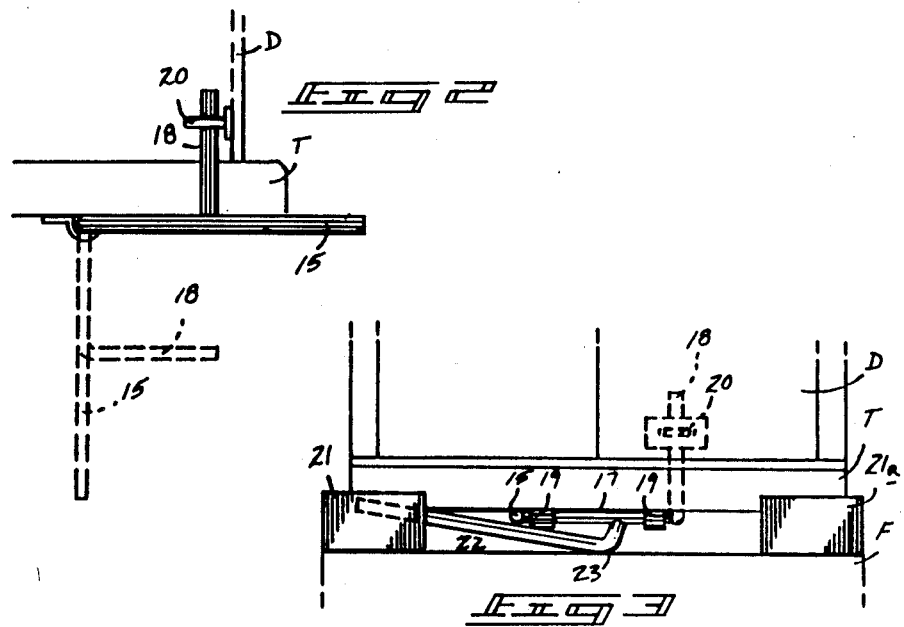
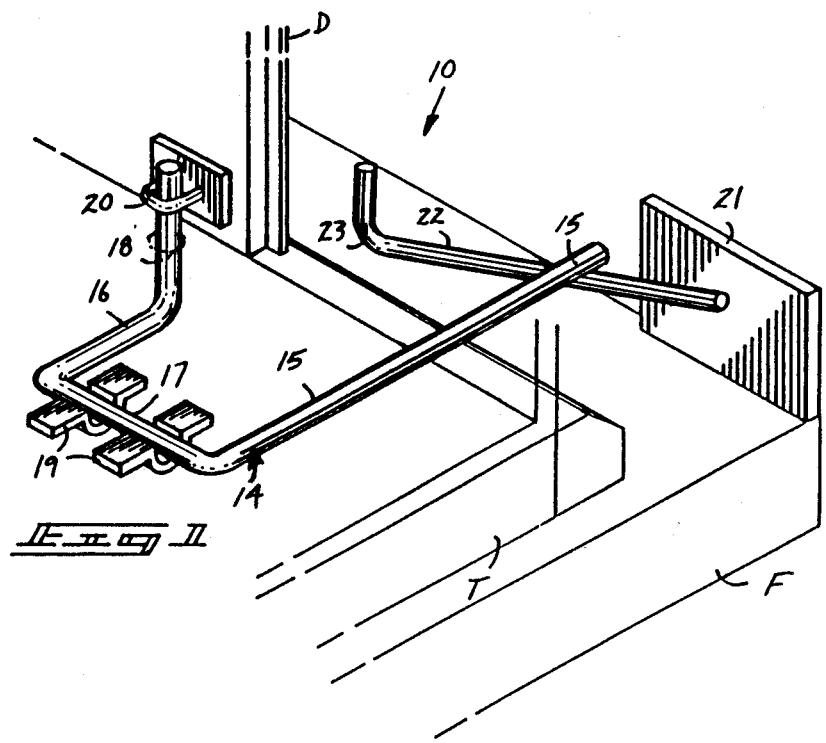

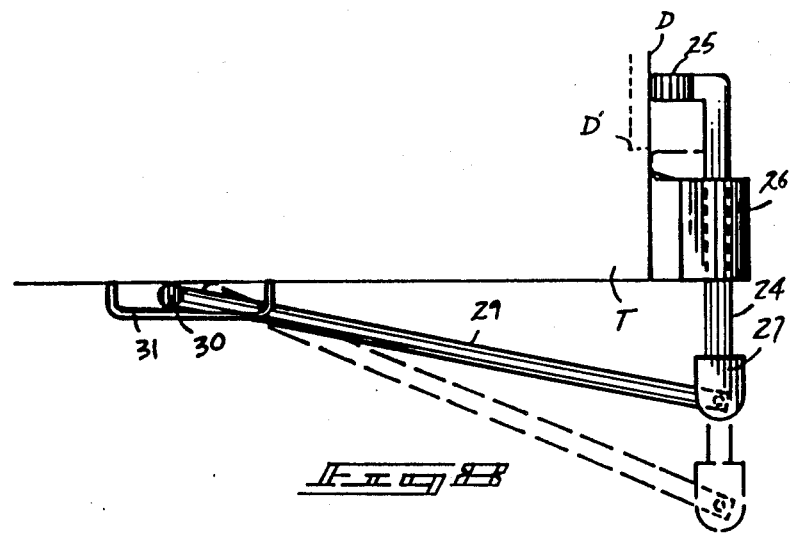
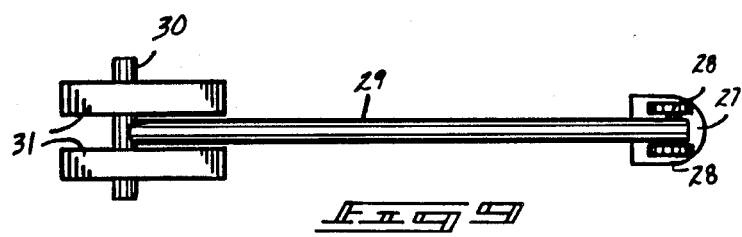
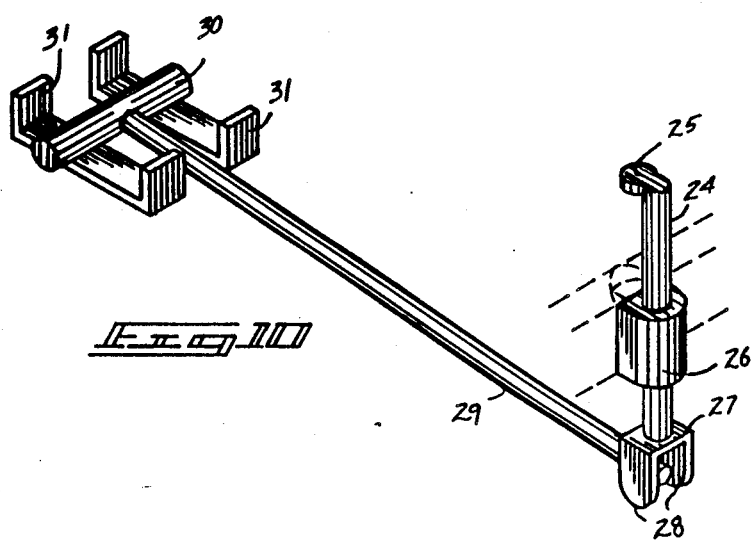

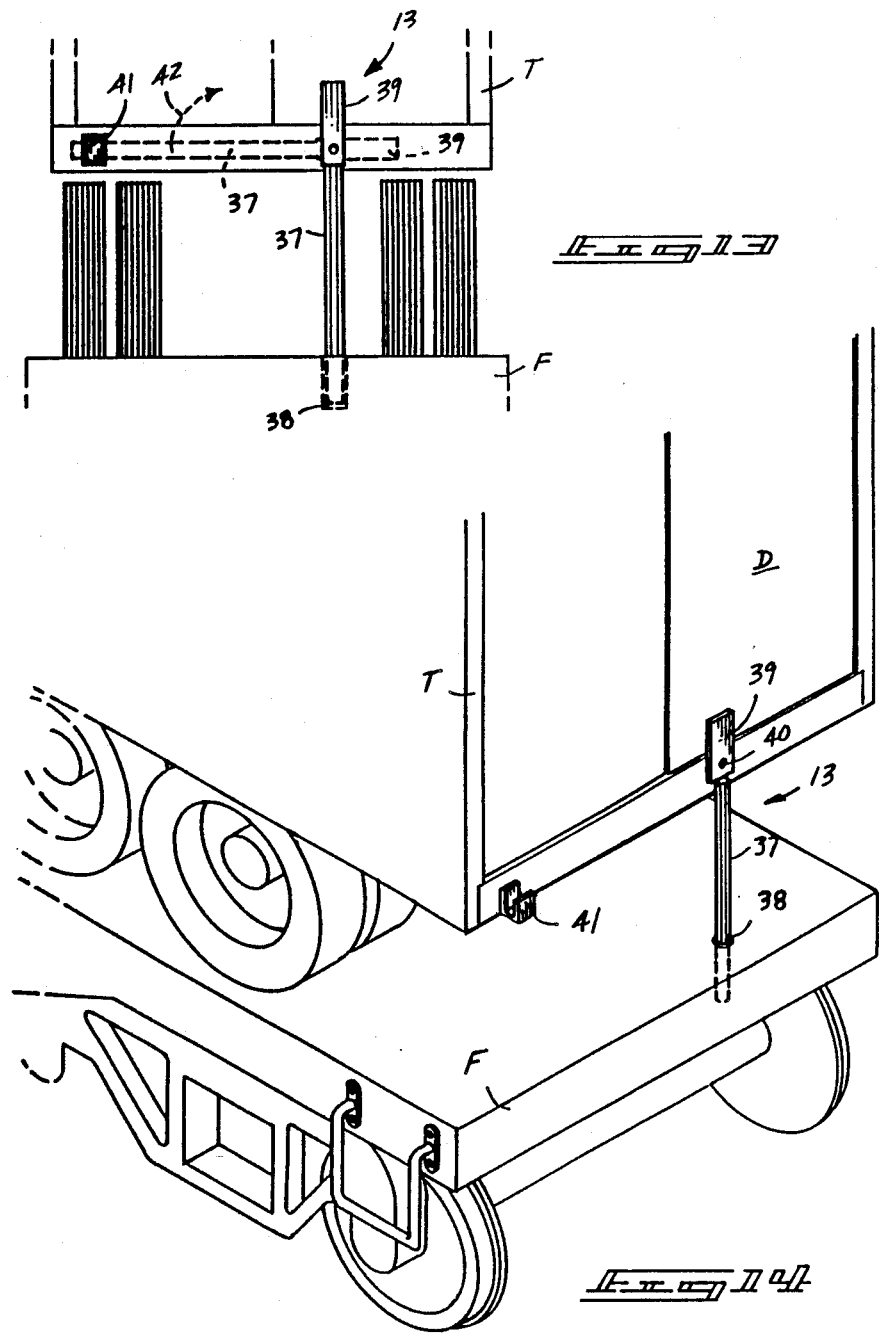

CARGO TRAILER SAFETY LOCK

BACKGROUND OF THE INVENTION

1. Field of the Invention

The present invention relates to safety lock mechanisms and particularly pertains to a new and improved cargo trailer safety lock mechanism that effect the latching and/or blocking of cargo trailer doors associated with a trailer positioned on conventional flatbed railroad cars.

2. Description of the Prior Art

The use of latch mechanisms in association with trailers is known in the prior art. Trailers of this category are positionable upon an associated flatbed or flatcar of a railroad or deck of a ship where such trailers are mounted during transport. In an effort to thwart theft and unwarranted into the interior of such trailers various latch mechanisms have been employed. For example, U.S. Pat. No. 3,580,185 to Bridge utilizes a series of overlying crossbeams extending over a first lower container and accordingly forms a support for an upper container wherein these beams utilize centering domes for controlled vertical movement with respect to a deck of an associated railroad flatcar. A second embodiment of the invention positions the domes at opposite sides of the aforenoted deck and then placed along the deck to accommodate containers of varying lengths and are further mounted on the noted deck for vertical shifting. A second embodiment enables the domes or latching mechanisms to be mounted directly on a lower container with a second container supported directly on the lower container. While a solution for securing stacked containers on a railroad flatcar, the Bridge patent fails to provide an effective means for efficiently and easily preventing intrusion into a railroad transported piggyback-type trailer.

U.S. Pat. No. 4,163,425 to Bedard sets forth an anchoring system for securing a trailer to a flatcar utilizing a beam securing the flatcar with an associated slideway formed in the beam with an anchoring member slidable in the slideway employing a prong engageable into an aperture into the corner posts of the associated trailer. The Bedard patent, as may be appreciated, sets forth an effective means of anchoring a trailer onto a flatcar, but fails to set forth an effective means of latching and maintaining trailer doors against unwarranted intrusion.

U.S. Pat. No. 4,347,023 to Rizos sets forth a securement system including a locking bolt biased towards a position for releasing a pin that maintains the locking bolt in a securement mode. When the pin is repositioned in a blocking element reoriented, the locking bolt is released and due to the biasing action, moved out of position where it secures the pin in a hold orientation. The Rizos patent is of interest relative to a latch mechanism but is of a structure and organization generally remote from that of the instant invention.

U.S. Pat. No. 2,775,855 to Leitner sets forth a securement means for maintaining a trailer on a railroad flatcar and merely includes a cooperating series of "U" shaped brackets secured to the trailer and flatcar with pins therebetween for maintaining the orientation of the trailer to the flatcar.

U.S. Pat. No. 3,088,670 to Harlander sets forth a cargo container securement means employing a series of flexible securement elements for tensioning a transport unit on a transport deck and as in other art of this nature, fails to provide an effective and efficient means of latching trailer doors on a piggyback type trailer in association with a railroad flatcar or other comparable transport deck.

As such, it may be appreciated that there is continuing need for a new and improved cargo trailer safety lock mechanism which addresses both the problem of ease of use and effectiveness, and in this respect, the present invention substantially fulfills this need.

SUMMARY OF THE INVENTION

In view of the foregoing disadvantages inherent in the known types of trailer latch mechanisms now present in the prior art, the present invention provides an cargo trailer safety lock wherein the same may be readily positioned to an associated trailer when not in use and may be further easily and efficiently reoriented for the latching and thwarting of tampering of an associated trailer. As such, the general purpose of the present invention, which will be described subsequently in greater detail, is to provide a new and improved cargo trailer safety lock which has all the advantages of the prior art trailer latch mechanisms and none of the disadvantages.

To attain this, the present invention comprises a generally "U" shaped latch mechanism with a first leg orthogonally directed upwardly through the trailer floor to latch the trailer doors with a second leg cooperating with a biasing rod to prevent withdrawal from the trailer doors of the safety latch mechanism. A second embodiment includes a vertically positionable latching bar that upon positioning a trailer onto an associated railroad flatcar is directed upwardly to block and prevent opening of the trailer doors. A second embodiment of the instant invention includes a generally "U" shaped latch bar pivotally mounted to a trailer floor with cooperating upstanding legs orthogonally oriented to the latch bar to effectively prevent opening of associated trailer doors while such trailer is positioned on an associated railroad flatcar. A third embodiment of the instant invention contemplates the use of a pivotally mounted bar formed with a plate thereto wherein the bar is pivotally mounted from a first position secured to the trailer to a second position orthogonally oriented to the first position to engage in an opening in a railroad flatcar and simultaneously pivot the flat portion to prevent opening of the associated trailer doors.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is of enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved cargo trailer safety lock mechanism which has all the advantages of the prior art cargo trailer safety lock mechanisms and none of the disadvantages.

It is another object of the present invention to provide a new and improved cargo trailer safety lock mechanisms which may be easily and efficiently manufactured and marketed.

It is a further object of the present invention to provide a new and imprprovide a new and improved cargo trailer safety lock mechanism which is of a durable and reliable construction.

An even further object of the present invention is to provide a new and improved cargo trailer safety lock mechanism which is susceptible of a low cost of manufacture with regard to both materials and labor, and which accordingly is then susceptible of low prices of sale to the consuming public, thereby making such cargo trailer safety lock mechanisms economically available to the buying public.

Still yet another object of the present invention is to provide a new and improved cargo trailer safety lock mechanism which provides in the apparatuses and methods of the prior art some of the advantages thereof, while simultaneously overcoming some of the disadvantages normally associated therewith Still another object of the present invention is to provide a new and improved cargo trailer safety lock that may be easily pivoted into use when desired and maintain such position while such trailer is maintained upon a railroad flatcar.

Yet another object of the present invention is to provide a new and improved cargo trailer safety lock mechanism wherein a safety lock mechanism is generally pivotally oriented relative to trailer doors and associate trailer to bar opening of the trailer doors.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matte in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention setting forth the instant invention latching a trailer door of a piggyback trailer on a railroad flatcar.

FIG. 2 is an orthographic side elevational view of the instant invention

FIG. 3 is a front elevational view of the instant invention.

FIG. 8 is an orthographic side elevational view of the instant invention in a somewhat enlarged illustration.

FIG. 9 is an underlying plan view of the embodiment set forth in FIG. 8.

FIG. 10 is an isometric illustration of the second embodiment of the instant invention illustrating the various components, their configuration, and relationship.

FIG. 13 is an orthographic view taken in elevation of a fourth embodiment of the instant invention.

FIG. 14 is an isometric illustration of the instant invention setting forth the various components, their parts, and relationship.

DESCRIPTION OF THE PREFERRED EMBODIMENT

Figure 4:
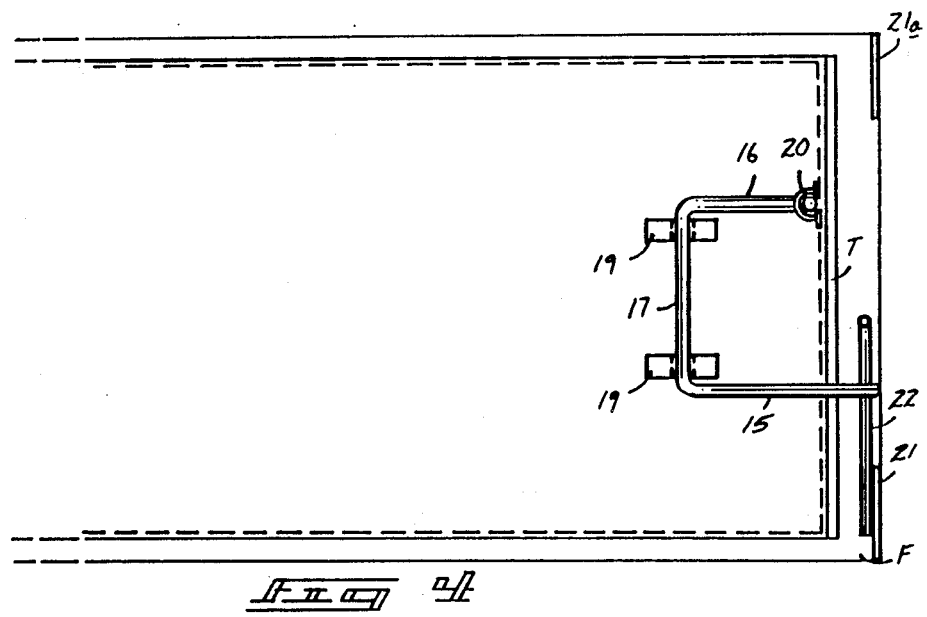
FIG. 4 is an orthographic plan view of the instant invention.
Figure 5:
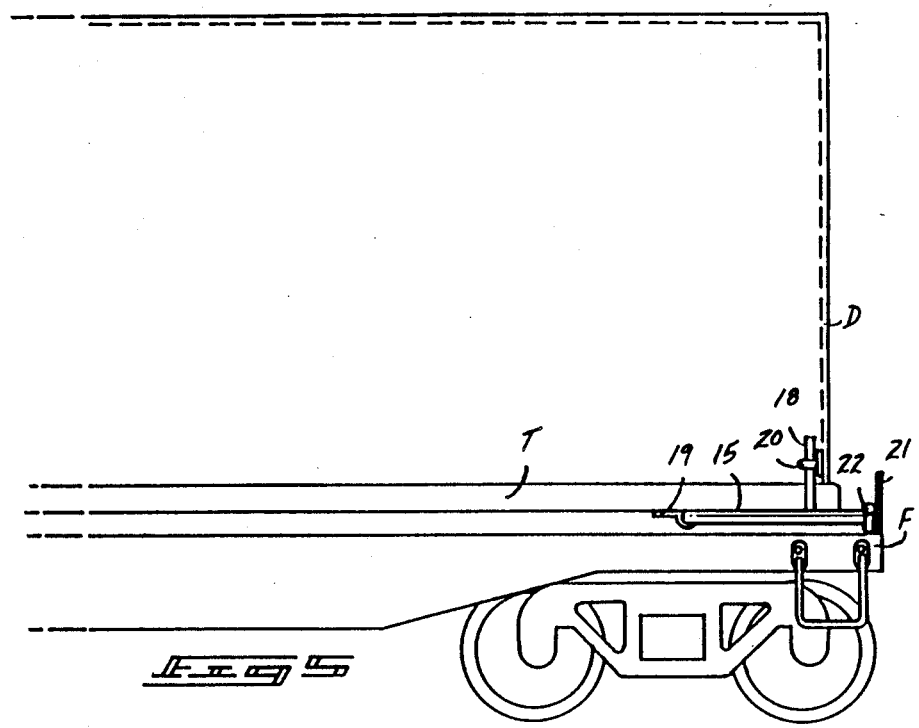
FIG. 5 is an orthographic side elevational view of the instant invention illustrating cooperation with an associated railroad flatcar.
Figure 6:
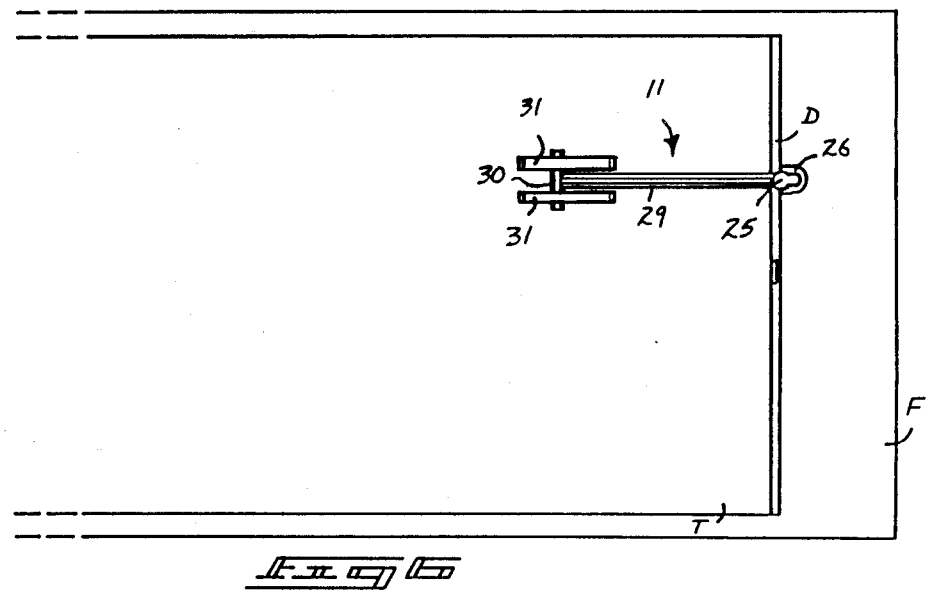
FIG. 6 is an orthographic plan view of a second embodiment of the instant invention.
Figure 7:
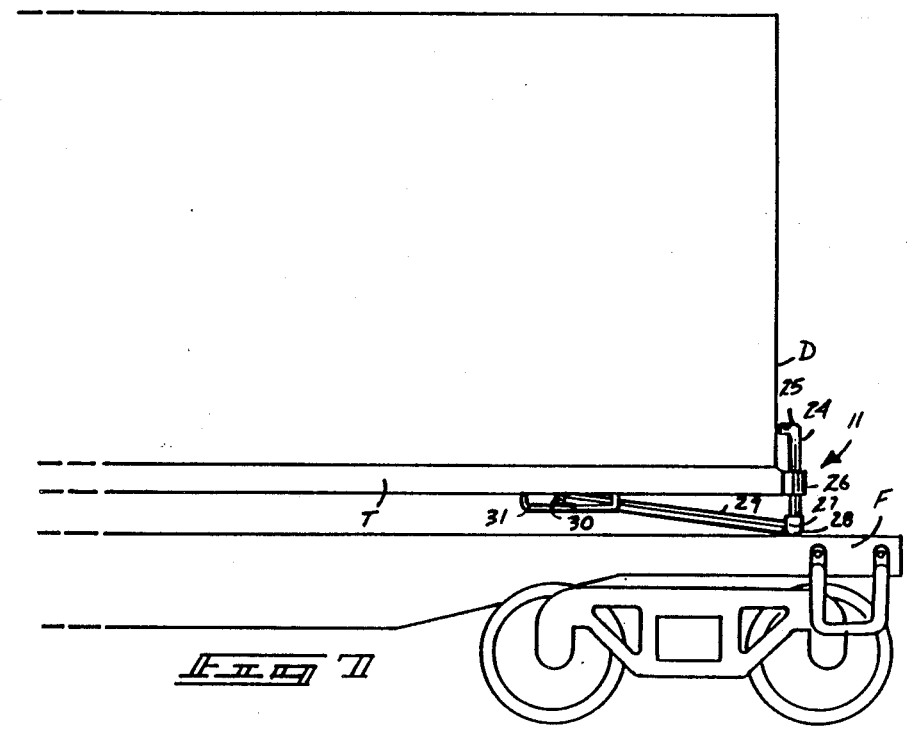
FIG. 7 is an orthographic side elevational view of the second embodiment of the instant invention.

With reference now to the drawings, and in particular to FIGS. 1, 10, 12, and 14 thereof, a new and improved cargo trailer safety lock embodying the principles and concepts of the present invention and generally designated by the reference numerals 10, 11, 12 and it will be described.

More specifically, it will be noted that the cargo trailer safety lock apparatus 10 essentially comprises a "U" shaped latch member 14 integrally formed to a first elongate leg 15 extending beyond the terminal end of a trailer "T". A second leg 16 along with first elongate leg 15 integrally secured to a base member 17 wherein the second leg 16 has orthogonally formed thereto a third leg 18 orthogonal to the second leg 16 yet nonparallel to first elongate leg 15. The "U" shaped latch member 14 is pivotally mounted to an underlying surface of trailer "T" by a plurality of trunnion supports 19 whereby upon upward pivotal movement of third leg 18, the leg 18 passes through an opening in a floor of trailer "T" to pass through a "U" shaped capture member 20 integrally secured to a door "D" of the trailer and in this manner secure the trailer doors against opening. As is typical with such trailer door pairs, a door "D" as illustrated in FIG. 1 secures a cooperating door by a typical extending flange, as illustrated The first elongate leg 15, upon upward pivotment of the "U" shaped latch member 14, is positioned to overlie a generally "L" shaped biasing bar 22 formed with a fulcrum surface 23 cooperating with an upper surface of a railroad flatcar "F". The "L" shaped biasing bar 22 is integrally secured to a first plate 21 of a plurality where a second plate 21a, as illustrated in FIG. 8, is positioned to prevent rearward shifting of the trailer "T". The "L" shaped biasing bar 22 is integrally secured to first plate 21 and upon positioning of the first elongate leg 15 thereover, the weight and positioning of trailer "T" upon the flatcar prevents removal of the third leg 18 from withdrawal of the "U" shaped catch member 20 until such removal of trailer "T" from the associated flatcar "F". The biasing resiliency of the "L" shaped biasing bar 22 with the trailer weight acting thereon further prevents tampering of the safety lock mechanism 10

A second embodiment of the instant invention, as illustrated in FIGS. 6 through 10, will now be described. A vertically reciprocating shaft 24 is slidingly positioned at a rearward portion of a trailer "T" formed with an inwardly directed head 25 orthogonal to reciprocating shaft 24 towards the associated door "D", as illustrated in FIGS. 6 through 10 A Yoke 26 slidingly secures the shaft 24 therethrough wherein shaft 24 is formed at an end remote from head 25 with a pivot connection 27 formed with a plurality of downwardly extending ears terminating in respective contact surfaces 28 to cooperate with an uppermost surface of flatcar "F" to direct the shaft 24 and associated head 25 upwardly to prevent opening of doors "D" formed rearwardly of the trailer "T". In a lowered position, as illustrated in FIG. 8, the head 25 drops below the lowermost edge of doors "D", as depicted as D' in FIG. 8.

An alignment link 29 is pivotally secured to the pivot connection 27 at one end and is formed with a "T" bar 30 slidingly secured with a plurality of "U" shaped capture brackets 31 with capture brackets 31 secured to an underlying surface of trailer "T".

As may be understood, upon positioning of a typical piggyback type trailer "T" upon flatcar "F", the contact surfaces 28 forces the shaft 24 and associated head 25 upwardly to engage a single or plurality of doors "D" of trailer "T" to prevent their opening. The alignment link 29 maintains the orientation of the shaft 24 and head 25 in its reciprocating path controlled by the yoke 26.

Figure 11:
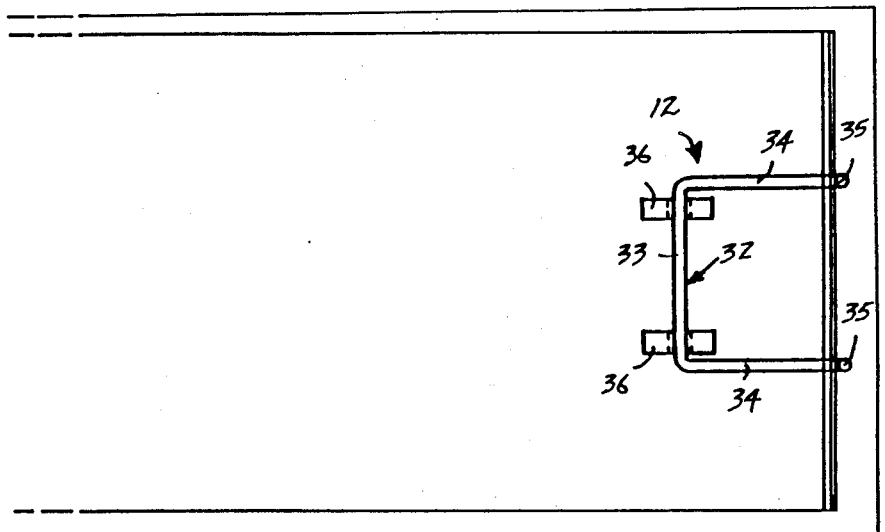
FIG. 11 is a top orthographic plan view of a third embodiment of the instant invention.
Figure 12:
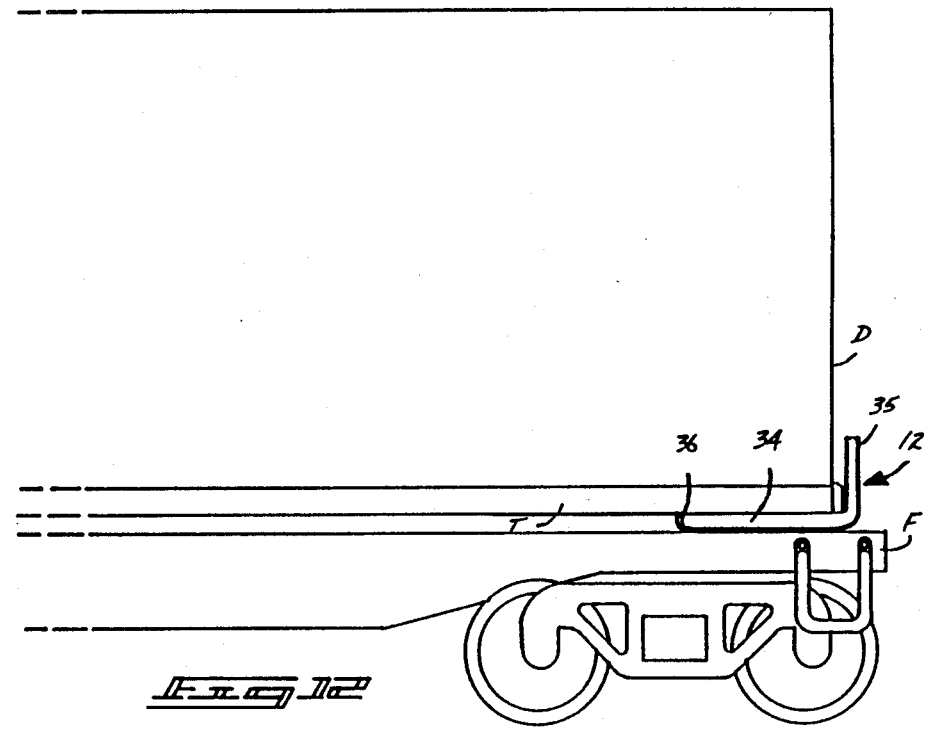
FIG. 12 is an orthographic side elevational view of a third embodiment of the instant invention.

With attention to FIGS. 11 and 12, a third embodiment 12 is set forth wherein a "U" shaped locking member 32 is formed with a pivot base 33 with a plurality of orthogonal legs 34 integrally formed thereto with legs 34 parallel to one another. Integrally and orthogonally secured to orthogonal legs 34 are a plurality of upstanding legs 35, each also parallel to one another and to legs 34. A plurality of bearing support brackets 35 are secured to the underlying surface of trailer "T" such that upon positioning of trailer "T" upon an upper surface of an associated railroad flatcar "F", as illustrated in FIG. 12, the "U" shaped locking member 82 is directed upwardly to a position, as illustrated in FIGS. 11 and 12, to prevent opening of doors "D".

Attention to FIGS. 13 and 14 set forth a fourth embodiment of the instant invention wherein a link bar 37 is integrally formed with a block plate 39 attached thereto at one terminal en thereof wherein the other terminal end of link bar 37 is positionable within a bore 38 formed within an upper surface of the railroad flatcar "F". The lock plate 39 has a pivot 40 formed therethrough and integrally secured to the trailer "T". A securement bracket 41 maintains the link bar in a convenient orientation when in non-use, as illustrated in FIG. 13 (in phantom).

Upon use of the invention, as set forth in FIGS. 13 and 14 the link bar 37 is rotated in the pivot direction, as set forth by arrow 42 in FIG. 13, and rotated clockwise to align with bore 38 such that upon positioning of the trailer "T" upon the flatcar "F", the link bar 37 is maintained in a vertical orientation as illustrated in FIGS. 13 and 14, with the block plate 39 projecting above the lowermost edges of a door "D" and thereby preventing unwarranted intrusion into the trailer "T" during transport thereof.

The manner of usage and operation of the present invention therefore should be apparent from the above description and accordingly no further discussion relative the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A cargo trailer safety lock apparatus for use in combination with an elongate vehicular trailer positioned on a transport surface with said trailer formed with rearwardly positioned-doors pivotally mounted to said trailer for movement outwardly of said trailer, said apparatus comprising,
    a latch bar pivotally secured to an underlying surface of said trailer proximate said trailer doors, and
    said latch bar including a plurality of legs with a first elongate leg means extending linearly beyond said trailer doors for cooperation with a biasing bar integrally secured to a plate means secured to said transport surface, and
    said latch bar including a second leg extending a distance parallel to said first elongate leg means, and
    a third leg means integrally and angularly secured to said second leg for passage through an opening in said underlying surface of said trailer and through a latch member secured on an interior surface of one of said doors for securement of said doors.

2. A cargo trailer safety lock as set forth in claim 1 wherein said latch bar comprises a generally "U" shaped member pivotally mounted within a plurality of trunnion supports with said trunnion supports integrally secured to said underlying surface.

3. A cargo trailer safety lock apparatus as set forth in claim 2 wherein said "U" shaped latch bar member includes a base portion pivotally mounted through said trunnion supports with said first elongate leg means orthogonally and integrally formed to said base at one end thereof and said second leg integrally and orthogonally secured to said base a its other end.

4. A cargo trailer safety lock apparatus as set forth in claim 3 wherein said biasing bar is formed in a generally "L" shaped member with a fulcrum surface cooperating with an upper surface of said transport surface to bias and maintain said safety lock apparatus in an operative orientation.

5. A cargo trailer safety lock apparatus as set forth in claim 4 wherein a second plate means is secured to said transport surface to prevent unwarranted rearward motion of said trailer relative to said transport surface.

6. A cargo trailer safety lock apparatus as set forth in claim 5 wherein said biasing bar is integrally secured to said plate means.

7. A cargo trailer safety lock apparatus as set forth in claim 6 wherein the first plate means and the second plate means are integrally secured in an orthogonal orientation relative to said transport surface.

8. A cargo trailer safety lock apparatus as set forth in claim 7 wherein the first plate means and the second plate means are spaced apart and disposed on opposite sides of said "U" shaped latch bar member.

9. A cargo trailer safety lock apparatus as set forth in claim 8 wherein the first plate means includes a forward surface and a rearward surface, and the forward surface is disposed in confronting relationship to the "U" shaped latch bar and includes the biasing bar integrally secured to the forward surface.

10. A cargo trailer safety lock apparatus as set forth in claim 9 wherein said first leg is of an axial length greater than said second leg and is spaced parallel to said first leg.

11. A cargo trailer safety lock apparatus as set forth in claim 10 wherein the third leg is integrally secured and extending orthogonally upwardly relative to the second leg.

* * * * *